United States Patent
Lee

(10) Patent No.: US 8,525,958 B2
(45) Date of Patent: Sep. 3, 2013

(54) LIQUID CRYSTAL DISPLAY

(75) Inventor: Moon Gyu Lee, Suwon-si (KR)

(73) Assignee: Samsung Display Co., Ltd. (KR)

( * ) Notice: Subject to any disclaimer, the term of this patent is extended or adjusted under 35 U.S.C. 154(b) by 284 days.

(21) Appl. No.: 12/979,841

(22) Filed: Dec. 28, 2010

(65) Prior Publication Data

US 2011/0222002 A1    Sep. 15, 2011

(30) Foreign Application Priority Data

Mar. 10, 2010  (KR) .................. 10-2010-0021243

(51) Int. Cl.
*G02F 1/1335*    (2006.01)

(52) U.S. Cl.
USPC .............. 349/96; 349/114; 349/187

(58) Field of Classification Search
USPC .............. 349/96, 113, 114, 187, 122, 138; 359/485.05; 445/24
See application file for complete search history.

(56) References Cited

U.S. PATENT DOCUMENTS

| | | | |
|---|---|---|---|
| 4,688,897 A | 8/1987 | Grinberg et al. | |
| 5,986,730 A | 11/1999 | Hansen et al. | |
| 6,975,455 B1 | 12/2005 | Kotchick et al. | |
| 6,977,702 B2 | 12/2005 | Wu | |
| 2006/0082700 A1 | 4/2006 | Gehlsen et al. | |
| 2008/0094547 A1* | 4/2008 | Sugita et al. | 349/96 |
| 2008/0100781 A1* | 5/2008 | Choo et al. | 349/96 |
| 2008/0284949 A1 | 11/2008 | Matsumori et al. | |
| 2009/0290105 A1* | 11/2009 | Takada | 349/96 |

FOREIGN PATENT DOCUMENTS

| | | |
|---|---|---|
| JP | 2004-109986 A | 4/2004 |
| JP | 2006047829 A | 2/2006 |
| JP | 2008058996 A | 3/2008 |
| JP | 2008102416 A | 5/2008 |
| JP | 2009086127 A | 4/2009 |
| KR | 1020060042481 A | 5/2006 |
| KR | 1020070103526 A | 10/2007 |
| KR | 1020080004880 A | 1/2008 |
| KR | 1020080079550 A | 9/2008 |
| KR | 1020090032467 A | 4/2009 |

* cited by examiner

*Primary Examiner* — Dung Nguyen
*Assistant Examiner* — Tai Duong
(74) *Attorney, Agent, or Firm* — Cantor Colburn LLP

(57) ABSTRACT

A liquid crystal display includes a first substrate, and a first optical conversion layer disposed on the first substrate. The first optical conversion layer includes a reflecting unit reflecting incident light, and a polarizing unit. The polarizing unit transmits light which oscillates in a first direction among the incident light, and reflects light which oscillates in a second direction different from the first direction among the incident light. The reflecting unit and the polarizing unit of the first optical conversion layer may be disposed in at least one pixel area.

19 Claims, 8 Drawing Sheets

1

LIQUID CRYSTAL DISPLAY

This application claims priority to Korean Patent Application No. 10-2010-0021243 filed on Mar. 10, 2010, and all the benefits accruing therefrom under 35 U.S.C. §119, the entire contents of which are incorporated herein by reference.

BACKGROUND OF THE INVENTION (a) Field of the Invention

The invention relates to a liquid crystal display.

(b) Description of the Related Art

A liquid crystal display, as one of flat panel displays that are being most widely used at present, includes two display panels. The liquid crystal display includes electric field generating electrodes such as a pixel electrode and a common electrode, and a liquid crystal layer interposed therebetween. The liquid crystal display generates an electric field in the liquid crystal layer by applying voltage to the electric field generating electrodes, and through the electric field, determines an orientation of liquid crystal molecules of the liquid crystal layer and controls polarization of incident light to thereby display images.

In general, a polarizer is attached onto each of outer surfaces of the two display panels, where the electric field generating electrode is formed to control polarization of incident light. The polarizer is an absorptive polarizer that absorbs light other than desired polarized light. Therefore, only some of light sources supplying light to the liquid crystal display by the polarizer are effectively used for displaying the images, thereby deteriorating light efficiency of the light source of the liquid crystal display.

BRIEF SUMMARY OF THE INVENTION

Exemplary embodiments of the invention has been made in an effort to provide a liquid crystal display having advantages of decreasing a manufacturing cost of the liquid crystal display and improving light efficiency of a light source supplying light to the liquid crystal display.

An exemplary embodiment of the invention provides a liquid crystal display that includes a first substrate, and a first optical conversion layer disposed on the first substrate. The first optical conversion layer includes a reflecting unit reflecting incident light, and a polarizing unit. The polarizing unit transmits light that oscillates in a first direction among the incident lights, and reflects light that oscillates in a second direction different from the first direction among the incident lights.

The reflecting unit and the polarizing unit of the first optical conversion layer may be disposed in at least one pixel area.

The liquid crystal display may further include a second substrate facing the first substrate, and a polarizer disposed outside of the second substrate. The polarizer may transmit the light that oscillates in the second direction and absorb light that oscillates in a third direction different from the second direction.

The first direction and the second direction may be vertical (e.g., perpendicular) to each other.

The liquid crystal display may further include a second substrate facing the first substrate, a polarizer disposed outside of the second substrate, and a second optical conversion layer disposed inside of the second substrate. The second optical conversion layer may reflect the light that oscillates in the first direction and transmit the light that oscillates the light in the second direction.

2

The polarizer may absorb the light that oscillates in the first direction and transmit the light that oscillates in the second direction.

The liquid crystal display may further include a plurality of thin films disposed on the first substrate, and an insulating layer disposed between the plurality of thin films and the first optical conversion layer.

The plurality of thin films may further include a plurality of signal lines such as gate lines and data lines, a switching element such as a thin film transistor connected to the plurality of signal lines, and a pixel electrode connected to the switching element.

The liquid crystal display may further include an insulating layer disposed on the first substrate and disposed at a position corresponding to (e.g., overlapping in a plan view) the reflecting unit of the first optical conversion layer.

According to an exemplary embodiment of the invention, a reflective polarizing unit reflecting a portion of incident light is disposed in a first portion of a pixel area, and a reflecting unit is disposed in a remainder of the pixel area to thereby decrease a manufacturing cost of a liquid crystal display, and improve light efficiency of a light source supplying light to the liquid crystal display.

BRIEF DESCRIPTION OF THE DRAWINGS

The above and other features of this disclosure will become more apparent by describing in further detail exemplary embodiments thereof with reference to the accompanying drawings, in which.

DETAILED DESCRIPTION OF THE INVENTION

Figure 1A:
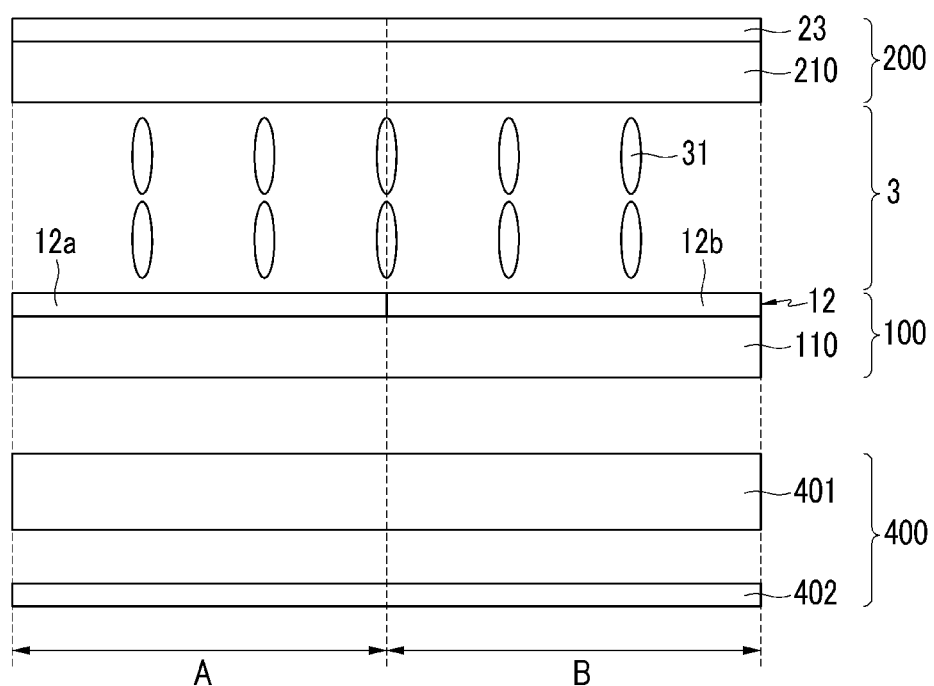
FIG. 1A is a cross-sectional view of an exemplary embodiment of a liquid crystal display, according to the invention.

The invention will be described more fully hereinafter with reference to the accompanying drawings, in which exemplary embodiments of the invention are shown. However, as those skilled in the art would realize, the described embodiments may be modified in various different ways, all without departing from the spirit or scope of the invention.

In the drawings, the thickness of layers, films, panels, regions, etc., are exaggerated for clarity. Like reference numerals designate like elements throughout the specification. As used herein, the term "and/or" includes any and all combinations of one or more of the associated listed items.

It will be understood that when an element such as a layer, film, region, or substrate is referred to as being "on" another element, it can be directly on the other element or intervening elements may also be present. In contrast, when an element is referred to as being "directly on" another element, there are no intervening elements present.

It will be understood that, although the terms first, second, third, etc., may be used herein to describe various elements, components, regions, layers and/or sections, these elements, components, regions, layers and/or sections should not be limited by these terms. These terms are only used to distinguish one element, component, region, layer or section from another region, layer or section. Thus, a first element, component, region, layer or section discussed below could be termed a second element, component, region, layer or section without departing from the teachings of the invention.

Spatially relative terms, such as "upper," "lower," and the like, may be used herein for ease of description to describe the relationship of one element or feature to another element(s) or feature(s) as illustrated in the figures. It will be understood that the spatially relative terms are intended to encompass different orientations of the device in use or operation, in addition to the orientation depicted in the figures. For example, if the device in the figures is turned over, elements described as "upper" relative to other elements or features would then be oriented "lower" relative to the other elements or features. Thus, the exemplary term "lower" can encompass both an orientation of above and below. The device may be otherwise oriented (rotated 90 degrees or at other orientations) and the spatially relative descriptors used herein interpreted accordingly.

The terminology used herein is for the purpose of describing particular embodiments only and is not intended to be limiting of the invention. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Embodiments of the invention are described herein with reference to cross-section illustrations that are schematic illustrations of idealized embodiments (and intermediate structures) of the invention. As such, variations from the shapes of the illustrations as a result, for example, of manufacturing techniques and/or tolerances, are to be expected. Thus, embodiments of the invention should not be construed as limited to the particular shapes of regions illustrated herein but are to include deviations in shapes that result, for example, from manufacturing.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

All methods described herein can be performed in a suitable order unless otherwise indicated herein or otherwise clearly contradicted by context. The use of any and all examples, or exemplary language (e.g., "such as"), is intended merely to better illustrate the invention and does not pose a limitation on the scope of the invention unless otherwise claimed. No language in the specification should be construed as indicating any non-claimed element as essential to the practice of the invention as used herein.

Hereinafter, a liquid crystal display according to exemplary embodiments of the invention will be described in brief with reference to the accompanying drawings.

FIG. 1A is a cross-sectional view of an exemplary embodiment of a liquid crystal display, according to the invention.

Referring to FIG. 1A, the liquid crystal display according to the exemplary embodiment of the invention includes a first display panel 100 and a second display panel 200 facing each other, a liquid crystal layer 3 interposed between the two display panels 100 and 200, and a light source section 400. The light source section 400 is disposed outside of the two display panels 100 and 200, generates light and supplies the generated light to the display panels 100 and 200.

The first display panel 100 includes a first insulating substrate 110 and an optical conversion layer 12 disposed thereon. The optical conversion layer 12 includes a reflecting unit 12a reflecting incident light, and a polarizing unit 12b transmitting light that oscillates in a first direction among incident lights and reflecting light that oscillates in a second direction different from the first direction. In an exemplary embodiment, the first direction and the second direction may be vertical (e.g., perpendicular) to each other.

The reflecting unit 12a of the optical conversion layer 12 is preferably disposed at a position corresponding to a non-opening area A of the liquid crystal display, e.g., an area where signal lines such as a gate line and a data line, a switching element such as a thin film transistor, a black matrix, etc. are disposed. The reflecting unit 12a overlaps the non-opening area A, in a plan view of the liquid crystal display.

The polarizing unit 12b of the optical conversion layer 12 is preferably disposed at a position corresponding to an area where an opening area B of the liquid crystal display, e.g., an area where a pixel electrode is disposed. The polarizing unit 12b overlaps the opening area B, in the plan view of the liquid crystal display.

Further, the reflecting unit 12a and the polarizing unit 12b of the optical conversion layer 12 may be completely disposed in at least one pixel area. As used herein, "corresponding" indicates being the same or aligned in quantity, shape, size or positional placement relative to another element.

A thickness of the optical conversion layer 12 may be about 5 μm and less than 5 μm, and more specifically, the thickness of the optical conversion layer 12 may be about 1 μm and less than 1 μm.

The optical conversion layer 12 may include a conductor having a high conductivity such as Au, Ag, Al, Ni, Cu, and Cr, more specifically, Al.

The second display panel 200 includes a second insulating substrate 210, and a polarizer 23 disposed outside of (e.g., on an outer surface of) the second insulating substrate 210. The polarizer 23 may absorb light that oscillates in the first direction, which is transmitted by the polarizing unit 12b of the optical conversion layer 12, and transmit the light that oscillates in the second direction, which is reflected by the polarizing unit 12b of the optical conversion layer 12.

That is, the polarizing unit 12b of the optical conversion layer 12 transmits the light that oscillates in the first direction and the polarizer 23 transmits the light that oscillates in the second direction. In one exemplary embodiment, the first direction and the second direction may be perpendicular to each other. Therefore, a polarization axis of the polarizing unit 12b of the optical conversion layer 12, and a polarization axis of the polarizer 23 may be orthogonal to each other.

The light source section 400 includes a light source 401 generating and supplying light, and a reflecting plate 402 disposed outside of (e.g., on an outer surface of) the light source 401 and improving efficiency of the light source 401.

The liquid crystal layer 3 includes a plurality of liquid crystal molecules 31. The liquid crystal molecules 31 may be arranged to be vertical (e.g., perpendicular) or horizontal (e.g., parallel) to the surface of the first insulating substrate 110 or the second insulating substrate 210 when no electric field is applied to the liquid crystal layer 3. In the illustrated embodiment, although the liquid crystal molecules 31 are arranged to be perpendicular to the surface of the first insulating substrate 110 or the second insulating substrate 210, the type of liquid crystal molecules 31 are not limited thereto, and may include any of a number of liquid crystal molecules 31 suitable for the purpose described herein.

When no electric field is applied to the liquid crystal layer 3 in the liquid crystal display, and the liquid crystal molecules 31 of the liquid crystal layer 3 are arranged to be perpendicular to the surface of the first insulating substrate 110 or the second insulating substrate 210, light that is irradiated from the light source section 400 and reaches the reflecting unit 12a of the optical conversion layer 12 through the first insulating substrate 110 is reflected by the reflecting unit 12a. Further, light that oscillates in the first direction among lights that are irradiated from the light source section 400 and reach the polarizing unit 12b of the optical conversion layer 12 is transmitted and continuously propagated by the polarizing unit 12b, while lights that oscillate in remaining directions are reflected and return to the light source section 400 by the polarizing unit 12b. After the lights oscillating in the remaining directions are reflected and returned to the light source section 400, the lights are again reflected by the reflecting plate 402 and reinputted into the first insulating substrate 110 of the first display panel 100.

The light transmitted by the polarizing unit 12b of the optical conversion layer 12 is substantially linearly propagated, while the polarization axis is not changed in a long-axis direction of the liquid crystal molecules 31 of the liquid crystal layer 3. When the light that oscillates in the first direction is straightly propagated and reaches the polarizer 23 through the second insulating substrate 210 of the second display panel 200, the polarizer 23 absorbs the light, such that the liquid crystal display displays black. This is called a normally black mode.

Light inputted into the liquid crystal layer 3 from the outside and initially through the polarizer 23 is reflected to the liquid crystal layer 3 by the reflecting unit 12a of the optical conversion layer 12, through the liquid crystal layer 3 again, to contribute to image display of the liquid crystal display. That is, the liquid crystal display may use at least a portion of the pixel area as a reflective display area by the reflecting unit 12a of the optical conversion layer 12. As described above, the reflecting unit 12a and the polarizing unit 12b of the optical conversion layer 12 may be disposed within one pixel area. Therefore, both the reflecting unit and a transmitting unit may be provided within one pixel area. Where the liquid crystal display includes a plurality of the pixel area, both the reflecting unit and a transmitting unit may be provided within each of the pixel areas, such that at least a portion of each of the pixel areas is a reflective display area defined by the reflecting unit 12a of the optical conversion layer 12.

When no electric field is applied to the liquid crystal layer 3, in the case of a twisted nematic mode ("TN-mode") liquid crystal display, in which the liquid crystal molecules 31 of the liquid crystal layer 3 are arranged to be horizontal (e.g., parallel) to the surface of the first insulating substrate 110 or the second insulating substrate 210, light that is irradiated from the light source section 400 is reflected by the reflecting unit 12a of the optical conversion layer 12 through the first insulating substrate 110. In the polarizing unit 12b of the optical conversion layer 12, the light that oscillates in the first direction is transmitted and continuously propagated, while lights that oscillate in the remaining directions are reflected. The light transmitted by the polarizing unit 12b of the optical conversion layer 12 is propagated while its polarization axis varies by approximately 90 degrees by the liquid crystal molecules 31 while passing through the liquid crystal layer 3. Therefore, when the light transmitted by the polarizing unit 12b of the optical conversion layer 12 reaches the polarizer 23 through the second insulating substrate 210 while its polarization axis varies in the second direction, the polarizer 23 transmits the light, such that the liquid crystal display displays a white. This is called a normally white mode.

Further in the TN mode, as described above, light inputted into the liquid crystal layer 3 from the outside through the polarizer 23 is reflected to the liquid crystal layer 3 by the reflecting unit 12a of the optical conversion layer 12, through the liquid crystal layer 3 again to contribute to image display of the liquid crystal display. That is, the liquid crystal display may use at least a portion of the pixel area as the reflective display area by the reflecting unit 12a of the optical conversion layer 12. Where the liquid crystal display includes a plurality of the pixel area, both the reflecting unit and a transmitting unit may be provided within each of the pixel areas, such that at least a portion of each of the pixel areas is a reflective display area defined by the reflecting unit 12a of the optical conversion layer 12.

As described above, the liquid crystal display according to the exemplary embodiment of the invention may use at least a portion of the pixel area as the reflective display area, and includes the optical conversion layer that transmits light that oscillates in a predetermined direction, reflects lights that oscillates in remaining directions, and returns light to the light source again to improve light efficiency of the light source. Also, the liquid crystal display may include a reflecting unit of a reflective or a semi-reflective display area, and a polarizing unit for polarization, as one layer. The one layer respectively positions the reflecting unit and the polarizing unit in a non-opening area and an opening area of the pixel area, to further improve the light efficiency and reduce a manufacturing cost of the polarizer.

Figure 1B:
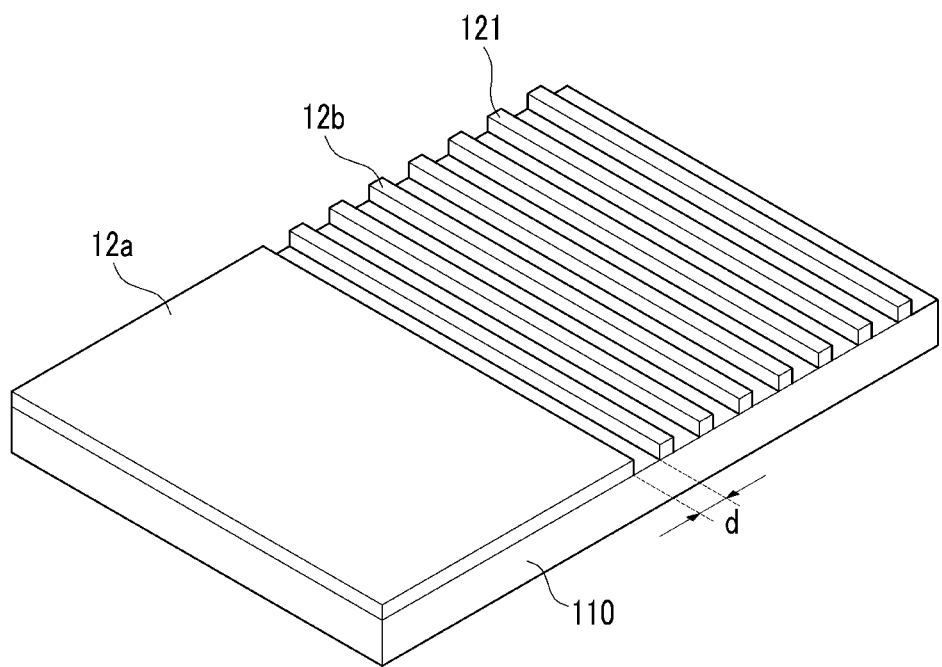
FIG. 1B is a diagram showing an exemplary embodiment of an optical conversion layer of a liquid crystal display, according to the invention.

Hereinafter, referring to FIG. 1B, an exemplary embodiment of the optical conversion layer 12 of the liquid crystal display, according to the invention will be described. FIG. 1B is a diagram showing the exemplary embodiment of the optical conversion layer 12 of the liquid crystal display, according to the invention.

Referring to FIG. 1B, the optical conversion layer 12 includes the reflecting unit 12a reflecting the incident light, and the polarizing unit 12b transmitting light that oscillates in the first direction among the incident lights and reflecting light that oscillates in a predetermined (e.g. remaining) direction.

As shown in the figure, the reflecting unit 12a is a metal plate having a predetermined plane shape. The polarizing unit 12b has a shape in which a plurality of a fine metal pattern 121 each extending in a predetermined direction are disposed in parallel at a predetermined interval. The plane-shaped reflecting unit 12a and the polarizing unit 12b including the fine metal patterns 121 are directly on the first insulating substrate 110 of the first display panel 100. The plane-shaped reflecting unit 12a and the polarizing unit 12b including the fine metal patterns 121 are directly adjacent to each other on the first insulating substrate 110.

An interval 'd' between adjacent fine metal patterns 121 of the reflecting unit 12b, may be in a range of approximately 20 nanometers (nm) to approximately 100 nanometers (nm). Light that oscillates in a length direction in which the fine metal patterns 121 of the polarizing unit 12b longitudinally extend is reflected, and light that oscillates in a direction perpendicular to the length direction in which the fine metal patterns 121 longitudinally extend is transmitted. As illustrated in FIG. 1B, the metal patterns 121 may longitudinally extend in a transverse direction of the first insulating substrate 110, and may be arranged in a longitudinal direction of the first insulating substrate 110.

The plane-shape of each of the fine metal patterns 121 may be square or trapezoidal.

A thickness of the optical conversion layer 12 may be about 5 μm and less than 5 μm, and more specifically, the thickness of the optical conversion layer 12 may be about 5 μm and less than 5 μm.

The optical conversion layer 12 may include a conductor having a high conductivity such as Au, Ag, Al, Ni, Cu, and Cr, more specifically, Al.

Both the reflecting unit 12a and the polarizing unit 12b of the optical conversion layer 12 may be formed in the following exemplary process. A metal layer reflecting light may be stacked or disposed, such as on an upper surface of the first insulating substrate 110, and thereafter, a portion of the stacked metal layer excluding the reflecting unit 12a, is patterned to form the fine metal patterns 121. That is, the reflecting unit 12a and the polarizing unit 12b are directly formed on the insulating substrate 110, and both include a same material. In an exemplary embodiment, the patterning of the metal layer may be performed by using imprinting and/or etching, to form the reflecting unit 12a and the polarizing unit 12b of the optical conversion layer 12.

A liquid crystal display structure including the optical conversion layer may be formed by patterning a single unitary indivisible metal layer to define a reflecting portion and a polarizing portion of the optical conversion layer at substantially a same time from a same material. The optical conversion layer of a final liquid crystal display including a reflecting portion reflecting incident light, and a polarizing portion transmitting light which oscillates in a first direction, among the incident light while reflecting light which oscillates in a second direction different from the first direction, among the incident light, in pixel areas, is considered a distinct structural characteristic of the final liquid crystal display. Since the optical conversion layer including the reflecting portion and the polarizing portion of a same material is imparted by a process of patterning the single unitary indivisible metal layer, such process is considered to impart the distinct structural characteristic of the final liquid crystal display.

A distal end of the metal patterns 121 and a distal end of the reflecting unit 12a, relative to the upper surface of the first insulating substrate 110, are at a same distance from the upper surface, as shown in FIGS. 1A and 1B, since both the reflecting unit 12a and the polarizing unit 12b are formed from the same single metal layer.

Accordingly, in the liquid crystal display including a light reflection area and a light transmission area for each pixel of the liquid crystal display according to the invention, the polarizing unit serving as the polarizer of the transmission area, may be formed by directly forming the optical conversion layer 12, including the reflecting unit 12a and the polarizing unit 12b, on a substrate, such that a manufacturing process is simple and the manufacturing cost can be reduced due to a decrease in the demand of the absorptive polarizer.

Further, the liquid crystal display according to the exemplary embodiment of the invention includes the optical conversion layer 12 including the reflecting unit 12a reflecting incident light, With the optical conversion layer, the polarizing unit 12b reflects at least a portion of the incident light. such that the light that is irradiated from the light source section 400 and reaches the reflecting unit 12a of the optical conversion layer 12 through the substrate is reflected by the reflecting unit 12a, light that oscillates in a predetermined direction among the lights irradiated from the light source section 400 and reach the polarizing unit 12b of the optical conversion layer 12 is transmitted and continuously propagated, and light that oscillates in remaining directions among the lights irradiated from the light source section 400 and reach the polarizing unit 12b is reflected and return to the light source 400, reflected by the reflecting plate 402 again and reinputted into the first insulating substrate 110. Accordingly, the efficiency of the light irradiated from the light source section 400 is improved.

Figure 2:
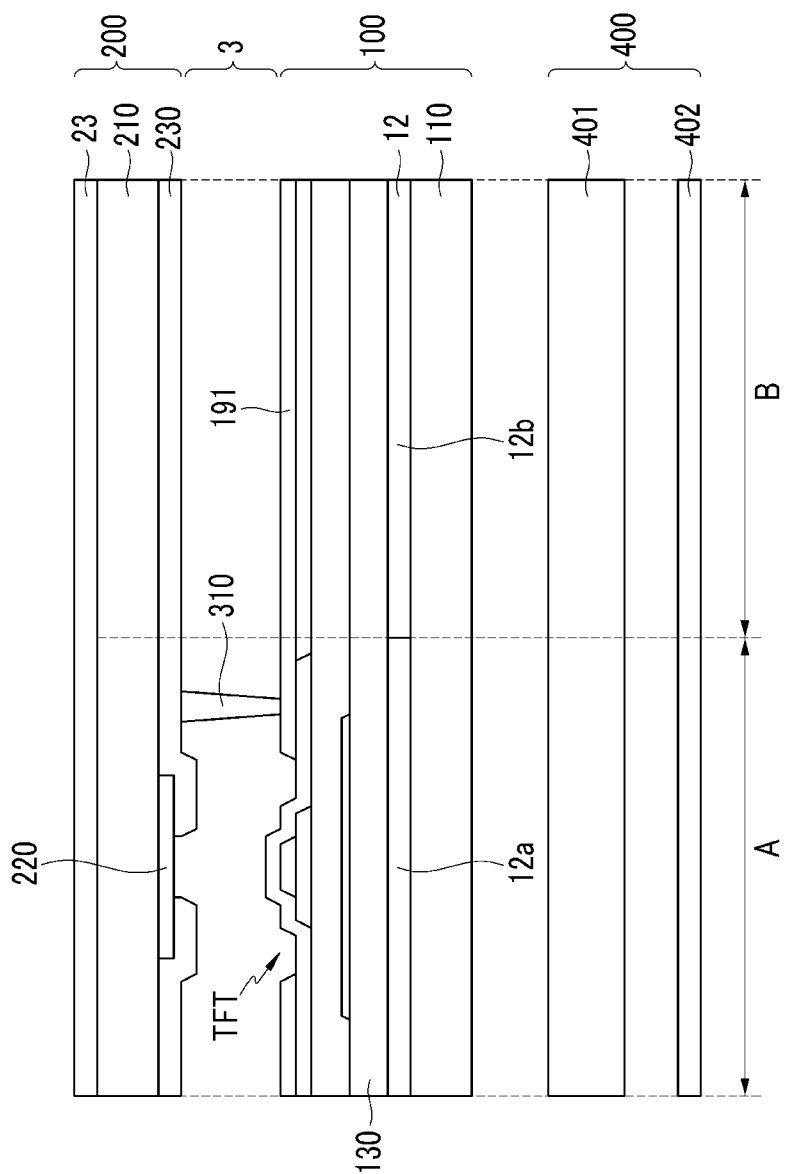
FIG. 2 is a cross-sectional view of another exemplary embodiment of a liquid crystal display, according to the invention.

Hereinafter, a liquid crystal display according to another embodiment of the invention will be described with reference to FIG. 2. FIG. 2 is a cross-sectional view of another exemplary embodiment of a liquid crystal display, according to the invention.

The liquid crystal display according to the embodiment of the invention shown in FIG. 2 is similar to the liquid crystal display according to the embodiment of the invention shown in FIG. 1A.

Referring to FIG. 2, the liquid crystal display according to the embodiment of the invention includes a first display panel 100 and a second display panel 200 facing each other, a liquid crystal layer 3 interposed between the two display panels 100 and 200, and a light source section 400 disposed outside of the two display panels 100 and 200 and supplying light to the display panels 100 and 200.

The first display panel 100 includes a first insulating substrate 110 and an optical conversion layer 12 disposed thereon. The optical conversion layer 12 includes a reflecting unit 12a reflecting incident light, and a polarizing unit 12b transmitting light that oscillates in a first direction among incident lights and reflecting light that oscillates in a second direction different from the first direction. In an exemplary embodiment, the first direction and the second direction may be perpendicular to each other.

The reflecting unit 12a of the optical conversion layer 12 is preferably disposed at a position corresponding to a non-opening area A of the liquid crystal display, e.g., an area where signal lines such as a gate line and a data line, a switching element such as a thin film transistor, a black matrix, etc. are disposed. The polarizing unit 12b of the optical conversion layer 12 is preferably disposed at a position corresponding to an opening area B of the liquid crystal display, e.g., an area where a pixel electrode is disposed.

A thickness of the optical conversion layer 12 may be about 5 μm and less than 5 μm, and more specifically, the thickness of the optical conversion layer 12 may be about 1 μm and less than 1 μm.

The optical conversion layer 12 may include a conductor having a high conductivity such as Au, Ag, Al, Ni, Cu, and Cr, more specifically, Al.

An insulating layer 130 is disposed directly on the optical conversion layer 12, and a plurality of thin films including a thin film transistor TFT and a pixel electrode 191 are disposed on the insulating layer 130.

The second display panel 200 includes a second insulating substrate 210, a polarizer 23 disposed outside the second insulating substrate 210. The second display panel 200 further includes a black matrix 220 and a color filter 230 disposed on the second insulating substrate 210.

The polarizer 23 may absorb light that oscillates in the first direction, which is transmitted by the polarizing unit 12b of the optical conversion layer 12, and transmit the light that oscillates in the second direction, which is reflected by the polarizing unit 12b of the optical conversion layer 12.

That is, the polarizing unit 12b of the optical conversion layer 12 transmits the light that oscillates in the first direction and the polarizer 23 transmits the light that oscillates in the second direction. In one exemplary embodiment, the first direction and the second direction may be perpendicular to each other. Therefore, a polarization axis of the polarizing unit 12b of the optical conversion layer 12 and a polarization axis of the polarizer 23 may be orthogonal to each other.

The light source section 400 includes a light source 401 generating and supplying light, and a reflecting plate 402 disposed outside of the light source 401 and improving efficiency of the light source 401.

The liquid crystal layer 3 includes a plurality of liquid crystal molecules (not shown). The liquid crystal molecules may be arranged to be perpendicular or parallel to the surface of the first insulating substrate 110 or the second insulating substrate 210 when no electric field is applied to the liquid crystal layer 3.

A spacer 310 for maintaining an interval between the two display panels 100 and 200, may be disposed between the two display panels 100 and 200, and directly in contact with the pixel electrode 191 and the common electrode 230.

However, unlike the liquid crystal display according to the embodiment shown in FIG. 1A, in the liquid crystal display according to the illustrated embodiment, the optical conversion layer 12 is disposed among a plurality of thin film structures such as the first insulating substrate 110, the thin film transistor TFT, and the pixel electrode 191.

Further, the insulating layer 130 is disposed between the optical conversion layer 12 and the thin film structures, so as to reduce or effectively prevent parasite capacitance from being generated between the optical conversion layer 12, and the pixel electrode 191 of the thin film structure.

Like the liquid crystal display according to the embodiment of the invention shown in FIG. 1A, in the liquid crystal display according to the illustrated, light that is inputted into the liquid crystal layer 3 from the outside through the polarizer 23 is reflected to the liquid crystal layer 3 again by the reflecting unit 12a of the optical conversion layer 12, and through the liquid crystal layer 3, to contribute to image display of the liquid crystal display, such that the liquid crystal display may use at least a portion of a pixel area as a reflective display area by using the reflecting unit 12a of the optical conversion layer 12.

As described above, the liquid crystal display according to the exemplary embodiment of the invention may use at least a portion of the pixel area as the reflective display area, and includes the optical conversion layer that transmits light that oscillates in a predetermined direction and reflects lights that oscillates in remaining directions, and returns to the light source again to improve light efficiency of the light source. Also, the liquid crystal display according to the illustrated embodiment may include a reflecting unit of a reflective display area, and a polarizing unit for polarization as one layer. The one layer respectively positions the reflecting unit and the polarizing unit in a non-opening area and an opening area of the pixel area, to further improve the light efficiency.

Features of the liquid crystal display described with reference to FIGS. 1A and 1B are applicable to the liquid crystal display according to the embodiment of the invention shown in FIG. 2.

Figure 3:
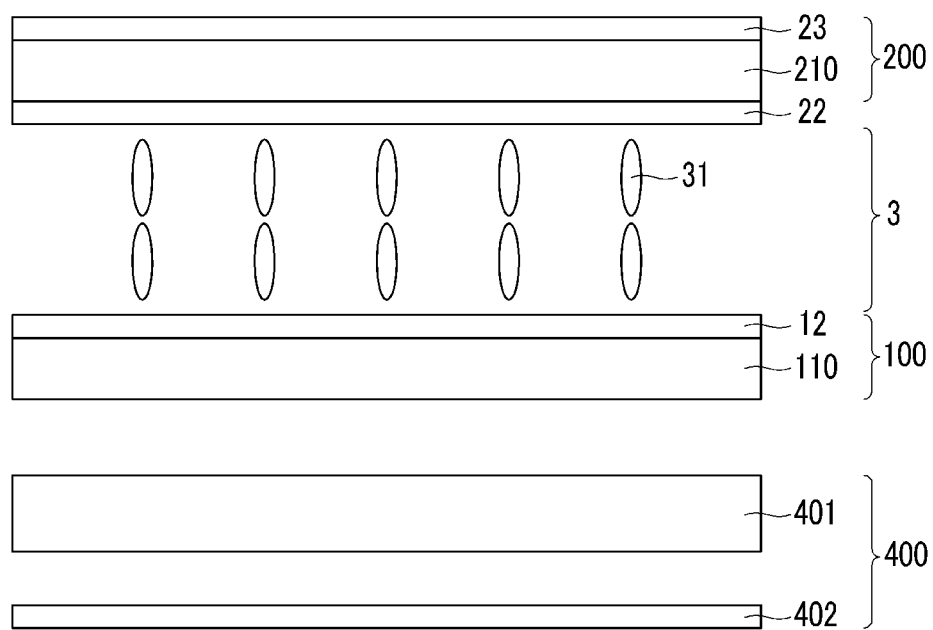
FIG. 3 is a cross-sectional view of another exemplary embodiment of a liquid crystal display, according to the invention.

Hereinafter, a liquid crystal display according to another embodiment of the invention will be described with reference to FIG. 3. FIG. 3 is a cross-sectional view of another exemplary embodiment of a liquid crystal display, according to the invention.

The liquid crystal display according to the embodiment of the invention shown in FIG. 3 is similar to the liquid crystal displays according to the embodiments of the invention shown in FIGS. 1A, 1B and FIG. 2.

Referring to FIG. 3, the liquid crystal display according to the invention includes a first display panel 100 and a second display panel 200 facing each other, a liquid crystal layer 3 interposed between the two display panels 100 and 200, and a light source section 400 disposed outside of the two display panels 100 and 200 and supplying light to the display panels 100 and 200.

The first display panel 100 includes a first insulating substrate 110 and a first optical conversion layer 12 disposed thereon. The first optical conversion layer 12 transmits light that oscillates in a first direction among incident lights and reflects light that oscillates in a second direction different from the first direction. The first optical conversion layer 12 may not include both the reflecting unit and the polarizing unit, such as illustrated in FIGS. 1A and 2, and may include only the polarizing unit. In an exemplary embodiment, the first direction and the second direction may be perpendicular to each other.

The second display panel 200 includes a second insulating substrate 210, a polarizer 23 disposed outside the second insulating substrate 210, and a second optical conversion layer 22 disposed on the second insulating substrate 210.

The second optical conversion layer 22 may include a polarizing unit that transmits light that oscillates in the second direction and reflects light that oscillates in the first direction among incident lights. That is, a polarization axis of the second optical conversion layer 22 may be perpendicular to a polarization axis of the first optical conversion layer 12.

The polarizer 23 may absorb the light that oscillates in the first direction, which is reflected by the second optical conversion layer 22 and transmit the light that oscillates in the second direction, which is transmitted by the second optical conversion layer 22.

That is, in the liquid crystal display according to the illustrated embodiment, the first optical conversion layer 12 and the second optical conversion layer 22 disposed on the first display panel 100 and the second display panel 200, respectively serve as two polarizers for a display operation of the liquid crystal display, and the polarizer 23 disposed on the second display panel 200 serves to absorb the light reflected by the second optical conversion layer 22. Accordingly, the polarizer 23 absorbs the light reflected by the polarizing unit of the second optical conversion layer 22 to improve a contrast ratio of the liquid crystal display.

A thickness of each of the first optical conversion layer 12 and the second optical conversion layer 22 may be about 5 μm and less than 5 μm, and more specifically, the thickness may be about 1 μm and less than 1 μm.

The first optical conversion layer 12 and the second optical conversion layer 22 may include a conductor having a high conductivity such as Au, Ag, Al, Ni, Cu, and Cr, more specifically, Al.

The light source section 400 includes a light source 401 generating and supplying light, and a reflecting plate 402 disposed outside of the light source 401 and improving efficiency of the light source 401.

The liquid crystal layer 3 includes a plurality of liquid crystal molecules 31. The liquid crystal molecules 31 may be arranged to be perpendicular or parallel to the surface of the first insulating substrate 110 or the second insulating substrate 210 when no electric field is applied to the liquid crystal layer 3. In the illustrated embodiment, although the liquid crystal molecules 31 are arranged to be perpendicular to the surface of the first insulating substrate 110 or the second insulating substrate 210, the type of liquid crystal molecules 321 are not limited thereto, and may include any of a number liquid crystal molecules 31 suitable for the purpose described herein.

Unlike the liquid crystal display according to the embodiments shown in FIGS. 1A and 2, the liquid crystal display according to the illustrated embodiment includes the first optical conversion layer 12 disposed on the first insulating substrate 110 and the second optical conversion layer 22 disposed on a first surface the second insulating substrate 210, and further includes the polarizer 23 disposed on a second surface opposing the first surface of the second insulating substrate 210.

The first optical conversion layer 12 and the second optical conversion layer 22 disposed on the first display panel 100 and the second display panel 200, respectively serve as two polarizers for a display operation of the liquid crystal display, and the polarizer 23 disposed on the second display panel 200 serves to absorb the light reflected by the second optical conversion layer 22. Accordingly, the polarizer 23 absorbs the light reflected by the polarizing unit of the second optical conversion layer 22, to improve a contrast ratio of the liquid crystal display.

Further, since two optical conversion layers 12 and 22 reflecting a portion of incident light may be used as two polarizers, some of the lights inputted into the display panels 100 and 200 from the light source section 400 are reflected by the two optical conversion layers 12 and 22, to the light source section 400, and reflected by the reflecting plate 402 of the light source 400 again, to improve light efficiency of the light source 401.

Like the liquid crystal display according to the embodiment shown in FIGS. 1A and 2, the liquid crystal display according to the embodiment uses an optical conversion layer that transmits light that oscillates in a predetermined direction, and reflects lights that oscillates in remaining directions to return the reflected light to the light source section as the polarizer, to improve the light efficiency of the light source section and reduce a manufacturing cost of the polarizer by forming the optical conversion layer in the display panel.

Features of the liquid crystal displays described with reference to FIGS. 1A, 1B and FIG. 2 are applicable to the liquid crystal display according to the embodiment of the invention shown in FIG. 3.

Figure 4:
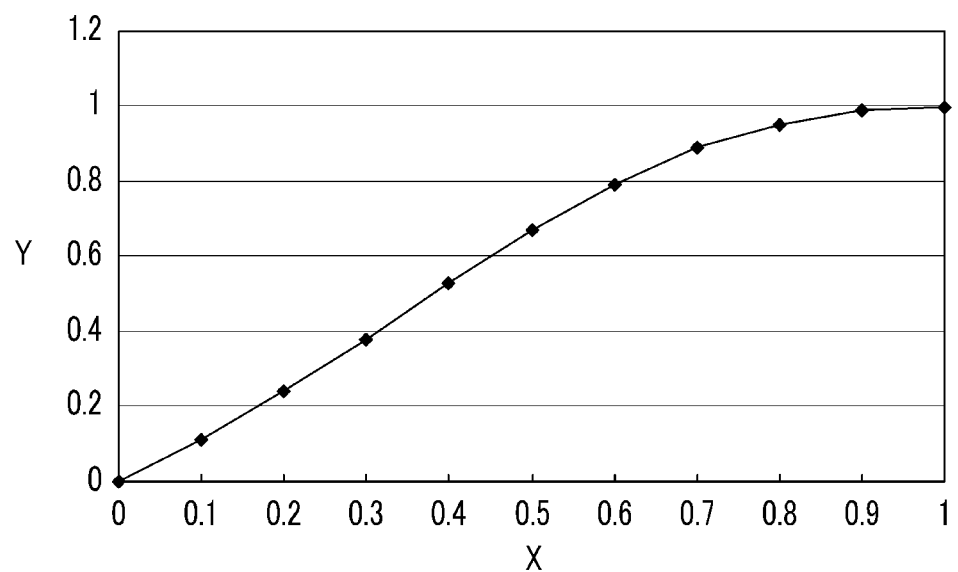
FIG. 4 is a graph comparing transmittances depending on gray-scales of a liquid crystal display according to the invention, and a conventional liquid crystal display.

Hereinafter, transmittance of the liquid crystal display according to an embodiment of the invention will be described with reference to FIG. 4. FIG. 4 is a graph comparing transmittances of a conventional liquid crystal display using two absorptive polarizers, and the liquid crystal display using the optical conversion layer as the polarizer according to the invention, depending on a gray-scale.

In FIG. 4, an X axis represents a case in which an operation of the conventional liquid crystal display uses two absorptive polarizers, and a Y axis represents a case in which the optical conversion layer reflecting a portion of the incident light is used as the polarizer, like the liquid crystal display according to the embodiments of the invention.

Referring to FIG. 4, in the same gray-scale, the transmittance of the liquid crystal display using the optical conversion layer as the polarizer according to the invention is higher than the transmittance of the conventional liquid crystal display using two absorptive polarizers. In the illustrated embodiment, for example, when the transmittance of the conventional liquid crystal display using two polarizers is approximately 0.5, the transmittance of the liquid crystal display using the optical conversion layer as the polarizer according to the invention is approximately 0.7. That is, when voltage having the same gray-scale is applied to the electric field generating electrodes, the liquid crystal display using the optical conversion layer as the polarizer according to the invention displays a gray-scale higher than the conventional liquid crystal display using two absorptive polarizers. Accordingly, the liquid crystal display using the optical conversion layer as the polarizer according to the invention improves the efficiency of the light source, and thus improves the transmittance of the liquid crystal display.

Further, since the transmittance of the conventional liquid crystal display and the transmittance of the liquid crystal display according to the invention depending on the gray-scale, correspond to each other by substantially one to one, it is possible to display a desired gray-scale by using a voltage value for each gray-scale used in the conventional liquid crystal display.

Figure 5:
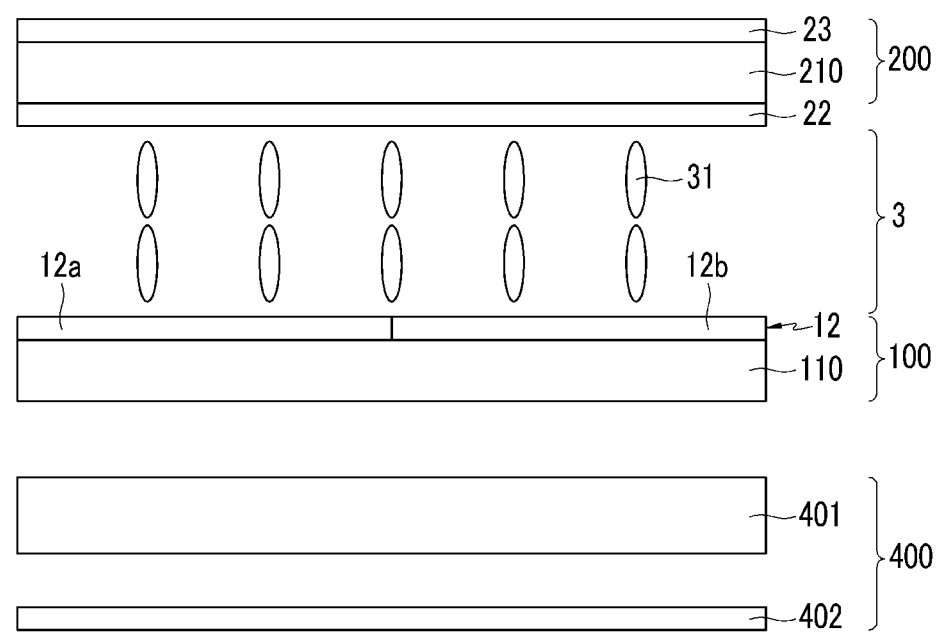
FIG. 5 is a cross-sectional view of another exemplary embodiment of a liquid crystal display, according to the invention.

Hereinafter, a liquid crystal display according to another embodiment of the invention will be described with reference to FIG. 5. FIG. 5 is a cross-sectional view of a liquid crystal display according to another exemplary embodiment of the invention.

The liquid crystal display according to the embodiment shown in FIG. 5 is similar to the liquid crystal display according to the embodiment shown in FIG. 3.

Referring to FIG. 5, the liquid crystal display according to the embodiment of the invention includes a first display panel 100 and a second display panel 200 facing each other, a liquid crystal layer 3 interposed between the two display panels 100 and 200, and a light source section 400 disposed outside of the two display panels 100 and 200 and supplying light to the display panels 100 and 200.

The first display panel 100 includes a first insulating substrate 110 and a first optical conversion layer 12 disposed thereon. The first optical conversion layer 12 includes a reflecting unit 12a reflecting incident light, and a polarizing unit 12b transmitting light that oscillates in a first direction and reflecting light that oscillates in a second direction different from the first direction among incident lights. In an exemplary embodiment, the first direction and the second direction may be perpendicular to each other.

The reflecting unit 12a of the optical conversion layer 12 is preferably disposed at a position corresponding to a non-opening area of the liquid crystal display, e.g., an area where signal lines such as a gate line and a data line, a switching element such as a thin film transistor, a black matrix, etc. are disposed. The polarizing unit 12b of the optical conversion layer 12 is preferably disposed at a position corresponding to an opening area of the liquid crystal display, e.g., an area where a pixel electrode is disposed.

The second display panel 200 includes a second insulating substrate 210, a polarizer 23 disposed outside the second insulating substrate 210 and a second optical conversion layer 22 disposed in the second insulating substrate 210. The second optical conversion layer 22 may include a polarizing unit that transmits light that oscillates in the second direction and reflects light that oscillates in the first direction among incident lights. In one exemplary embodiment, a polarization axis of the second optical conversion layer 22 may be perpendicular to a polarization axis of the first optical conversion layer 12.

A thickness of each of the first optical conversion layer 12 and the second optical conversion layer 22 may be about 5 μm and less than 5 μm, and more specifically, the thickness may be about 1 μm and less than 1 μm.

The first optical conversion layer 12 and the second optical conversion layer 22 may include a conductor having a high conductivity such as Au, Ag, Al, Ni, Cu, and Cr, more specifically, Al.

The polarizer 23 may absorb the light that oscillates in the first direction, which is reflected by the second optical conversion layer 22, and transmit the light that oscillates in the second direction, which is transmitted by the second optical conversion layer 22.

That is, in the liquid crystal display according to the illustrated embodiment, the first optical conversion layer 12 and the second optical conversion layer 22 disposed on the first display panel 100 and the second display panel 200, respectively serve as two polarizers for a display operation of the liquid crystal display, and the polarizer 23 disposed on the second display panel 200 serves to absorb the light reflected by the second optical conversion layer 22. Accordingly, the polarizer 23 absorbs the light reflected by the polarizing unit of the second optical conversion layer to improve a contrast ratio of the liquid crystal display.

The light source section 400 includes a light source 401 supplying light, and a reflecting plate 402 disposed outside of the light source 401 and improving efficiency of the light source 401.

The liquid crystal layer 3 includes a plurality of liquid crystal molecules 31. The liquid crystal molecules 31 may be arranged to be perpendicular or parallel to the surface of the first insulating substrate 110 or the second insulating substrate 210 when no electric field is applied to the liquid crystal layer 3. In the illustrated embodiment, although the liquid crystal molecules 31 are arranged to be perpendicular to the surface of the first insulating substrate 110 or the second insulating substrate 210, the type of liquid crystal molecules 31 are not limited thereto and may include any of a number of liquid crystal molecules 31 suitable for the purpose described herein.

Unlike the liquid crystal display according to the embodiment shown in FIGS. 1A and 2, the liquid crystal display according to the illustrated embodiment includes the first optical conversion layer 12 disposed on the first insulating substrate 110 and the second optical conversion layer 22 disposed on a first surface of the second insulating substrate 210, and further includes the polarizer 23 disposed on a second surface of the second insulating substrate 210 opposing the first surface.

Further, unlike the liquid crystal display according to the embodiment shown in FIG. 3, the first optical conversion layer 12 includes a reflecting unit 12a and the polarizing unit 12b.

The first optical conversion layer 12 and the second optical conversion layer 22 disposed on the first display panel 100 and the second display panel 200, respectively serve as two polarizers for a display operation of the liquid crystal display, and the polarizer 23 disposed on the second display panel 200 serves to absorb the light reflected by the second optical conversion layer 22. Accordingly, the polarizer 23 absorbs the light reflected by the polarizing unit of the second optical conversion layer 22 to improve a contrast ratio of the liquid crystal display.

Further, since two optical conversion layers 12 and 22 reflecting a portion of incident light are used as two polarizers, some of the lights inputted into the display panels 100 and 200 by the light source section 400 are reflected by the two optical conversion layers 12 and 22, and reflected on the reflecting plate 402 of the light source 400 again, to improve light efficiency of the light source 401.

Further, as described above, light inputted into the liquid crystal layer 3 from the outside is reflected to the liquid crystal layer 3 again, by the reflecting unit 12a of the optical conversion layer 12 through the liquid crystal layer 3 to contribute to image display of the liquid crystal display. That is, the liquid crystal display may use at least a portion of the pixel area as the reflective display area by the reflecting unit 12a of the first optical conversion layer 12.

As described above, the liquid crystal display according to the embodiment of the invention may use at least a portion of a pixel area as a reflective display area. The liquid crystal display includes an optical conversion layer that transmits light that oscillates in a predetermined direction and reflects lights that oscillate in remaining directions, and returns to the light source section again so as to improve light efficiency of the light source section.

Further, in one exemplary embodiment, the polarizing unit serving as the polarizer in the transmission area may be formed in the manufacturing of a reflective liquid crystal display, such as by forming at substantially a same time a reflecting unit of a semi-reflective or reflective display area, and a polarizing unit for polarization from one single unitary indivisible layer, such that a manufacturing process is simple and the manufacturing cost can be reduced due to a decrease in the demand of the absorptive polarizer.

Accordingly, in the liquid crystal display including a light reflection area and a light transmission area for each pixel of the liquid crystal display according to the invention, the polarizing unit serving as the polarizer of the transmission area, may be formed by directly forming the optical conversion layer 12 including the reflecting unit 12a and the polarizing unit 12b, on a substrate.

Features of the liquid crystal displays described with reference to FIGS. 1A, 1B, FIG. 2, and FIG. 3 are applicable to the liquid crystal display according to the embodiment of the invention shown in FIG. 5.

Figure 6:
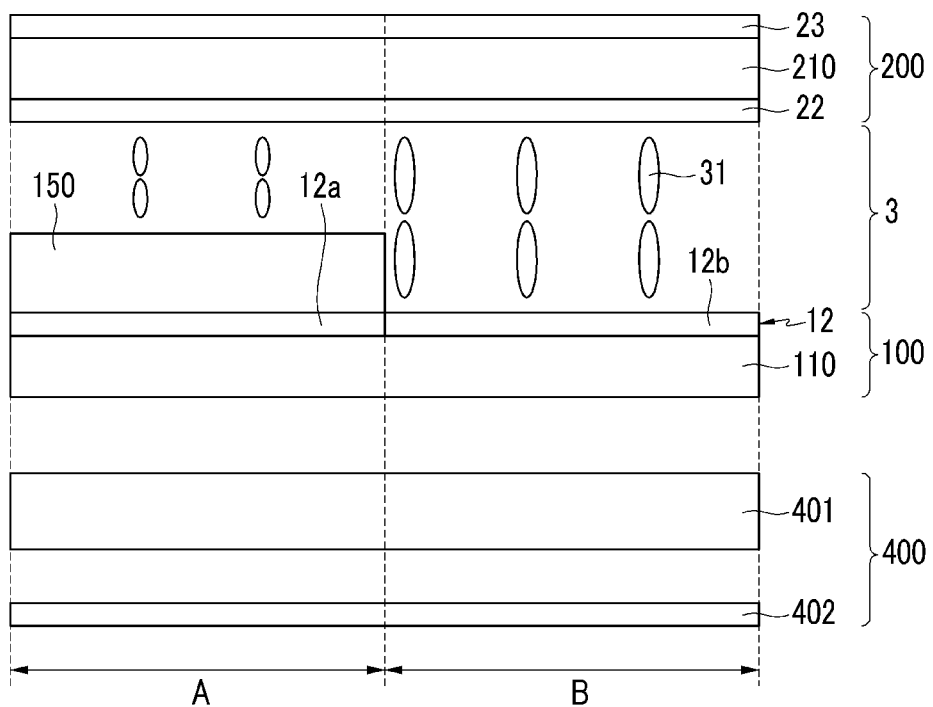
FIG. 6 is a cross-sectional view of another exemplary embodiment of a liquid crystal display, according to the invention.

Hereinafter, a liquid crystal display according to another embodiment of the invention will be described with reference to FIG. 6. FIG. 6 is a cross-sectional view of a liquid crystal display according to another exemplary embodiment of the invention.

Referring to FIG. 6, the liquid crystal display according to the embodiment is similar to the liquid crystal display shown in FIG. 5.

Referring to FIG. 6, the liquid crystal display according to the invention includes a first display panel 100 and a second display panel 200 facing each other, a liquid crystal layer 3 interposed between the two display panels 100 and 200, and a light source section 400 disposed outside of the two display panels 100 and 200 and supplying light to the display panels 100 and 200.

The first display panel 100 includes a first insulating substrate 110 and a first optical conversion layer 12 disposed thereon. The second display panel 200 includes a second insulating substrate 210 and a polarizer 23 disposed outside the second insulating substrate 210. The polarizer 23 may absorb the light transmitted by the first optical conversion layer 12 and transmit the light reflected by the first optical conversion layer 12.

A thickness of the first optical conversion layer 12 may be about 5 µm and less than 5 µm, and more specifically, the thickness of the first optical conversion layer 12 may be about 5 µm and less than 5 µm.

The first optical conversion layer 12 may include a conductor having a high conductivity such as Au, Ag, Al, Ni, Cu, and Cr, more specifically, Al.

The light source section 400 includes a light source 401 supplying light, and a reflecting plate 402 disposed outside of the light source 401 and improving efficiency of the light source 401.

The liquid crystal layer 3 includes a plurality of liquid crystal molecules 31. The liquid crystal molecules 31 may be arranged to be perpendicular or parallel to the surface of the first insulating substrate 110 or the second insulating substrate 210 when no electric field is applied to the liquid crystal layer 3. In the illustrated embodiment, although the liquid crystal molecules 31 are arranged to be perpendicular to the surface of the first insulating substrate 110 or the second insulating substrate 210, the type of liquid crystal molecules 31 are not limited thereto and may include any of a number of liquid crystal molecules 31 suitable for the purpose described herein.

The liquid crystal display according to the illustrated embodiment further includes an insulating layer 150 having a predetermined thickness taken perpendicular to a surface of the first insulating substrate 110, at a position corresponding to the reflecting unit 12a of the first optical conversion layer 12, unlike the liquid crystal display shown in FIG. 5. The insulating layer 150 compensates a difference in path of lights inputted into the liquid crystal layer 3, by adjusting a different in thickness of the liquid crystal layer 3 between the non-opening area (e.g., reflection portion) A and the opening area (e.g., transmission portion) B of the liquid crystal display, to control the lights inputted into the reflection portion A and the transmission portion B in the one pixel area of the liquid crystal display to have substantially the same path.

Further, as described above, light inputted into the liquid crystal layer 3 from the outside is reflected to the liquid crystal layer 3 again by the reflecting unit 12a of the optical conversion layer 12, back through the liquid crystal layer 3, to contribute to image display of the liquid crystal display. That is, the liquid crystal display may use at least a portion of the pixel area as the reflective display area by the reflecting unit 12a of the first optical conversion layer 12.

As described above, the liquid crystal display according to the embodiment of the invention may use at least a portion of a pixel area as a reflective display area. The liquid crystal display includes an optical conversion layer that transmits light that oscillates in a predetermined direction, and reflects lights that oscillate in remaining directions and returns the reflected light to the light source section again, so as to improve light efficiency of the light source section.

Further, the polarizing unit serving as the polarizer of the transmission area may be formed in the manufacturing of a reflective liquid crystal display, such as by forming at substantially a same time a reflecting unit of a semi-reflective or reflective display area, and a polarizing unit for polarization from one single unitary indivisible layer, such that a manufacturing process is simple and the manufacturing cost can be reduced due to a decrease in the demand of the absorptive polarizer.

Features of the liquid crystal displays described with reference to FIGS. 1A, 1B, FIG. 2, FIG. 3, and FIG. 5 are applicable to the liquid crystal display according to the embodiment shown in FIG. 6.

Figure 7:
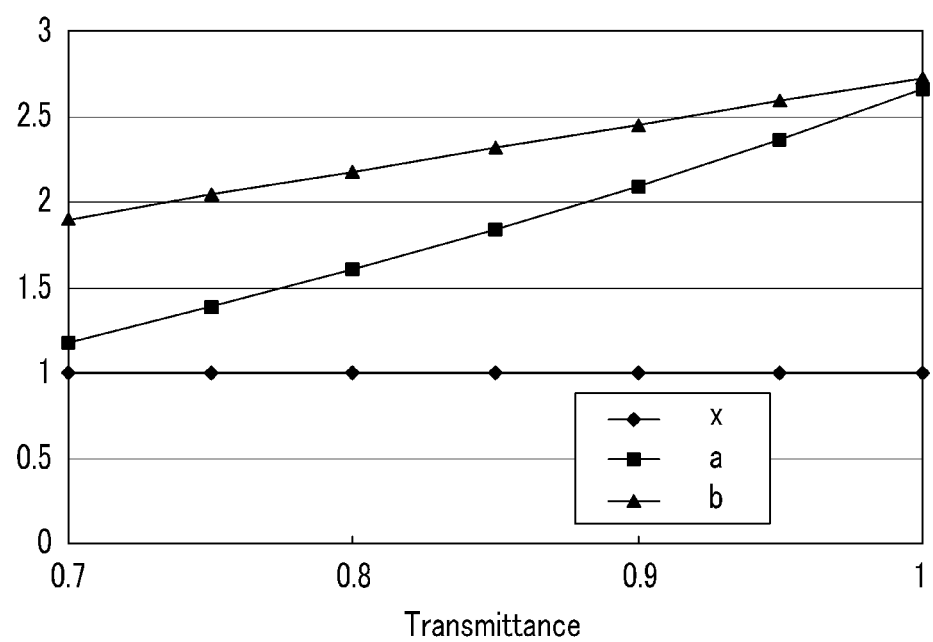
FIG. 7 is a graph showing an increase in luminance of a liquid crystal display according to an exemplary embodiment of the invention, in comparison with a conventional liquid crystal display.

Hereinafter, luminance of a liquid crystal display according to an exemplary embodiment of the invention will be described with reference to FIG. 7. FIG. 7 is a graph showing an increase in luminance of a liquid crystal display according to an exemplary embodiment of the invention in comparison with a conventional liquid crystal display.

In FIG. 7, 'x' (—♦—) represents a case in which a display operation of the conventional liquid crystal display using two absorptive polarizers is implemented, 'a' (—■—) represents a case of the liquid crystal display according to the embodiment shown in FIG. 1A or 2, and 'b' (—▲—) represents a case of the liquid crystal display according to the embodiment shown in FIG. 3, 5, or 6. Herein, reflectance of light of the optical conversion layer is approximately 85% and an opening ratio of the liquid crystal display is approximately 50%.

Referring to FIG. 7, transmittances of both the cases 'a' and 'b' of the liquid crystal displays according to the embodiments of the invention increase. in comparison with the transmittance of the case x of the conventional liquid crystal display.

While this invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

What is claimed is:

1. A liquid crystal display, comprising:
a first substrate;
a plurality of thin films disposed on the first substrate; and
a first optical conversion layer disposed on the first substrate and in a different layer than the plurality of thin films, the first optical conversion layer including:
a reflecting unit reflecting incident light; and
a polarizing unit in a same layer as the reflecting unit,
wherein the polarizing unit transmits light which oscillates in a first direction, among the incident light, and reflects light which oscillates in a second direction different from the first direction, among the incident light,
wherein the plurality of thin films include a signal line, a switching element connected to the signal line, and a pixel electrode connected to the switching element.

2. The liquid crystal display of claim 1, wherein:
the reflecting unit and the polarizing unit of the first optical conversion layer are disposed in at least one pixel area.

3. The liquid crystal of claim 2, further comprising:
a second substrate facing the first substrate; and
a polarizer disposed on an outer surface of the second substrate,
wherein the polarizer transmits the light which oscillates in the second direction, and absorbs light which oscillates in the first direction different from the second direction.

4. The liquid crystal display of claim 3, wherein:
the first direction and the second direction are perpendicular to each other.

5. The liquid crystal display of claim 2, further comprising:
a second substrate facing the first substrate;
a polarizer disposed on an outer surface of the second substrate; and
a second optical conversion layer disposed on an inner surface of the second substrate opposing the outer surface,
wherein the second optical conversion layer reflects the light which oscillates in the first direction, and transmits the light which oscillates in the second direction.

6. The liquid crystal display of claim 5, wherein:
the first direction and the second direction are perpendicular to each other.

7. The liquid crystal display of claim 5, wherein:
the polarizer absorbs the light which oscillates in the first direction, and transmits the light which oscillates in the second direction.

8. The liquid crystal display of claim 2, further comprising:
an insulating layer disposed between the plurality of thin films and the first optical conversion layer.

9. The liquid crystal display of claim 2, further comprising:
an insulating layer disposed on the first optical conversion layer, wherein a thickness of the insulating layer overlapping the reflecting unit of the first optical conversion layer is larger than a thickness of the insulating layer overlapping the polarizing unit of the first optical conversion layer.

10. The liquid crystal display of claim 1, further comprising:
a second substrate facing the first substrate; and
a polarizer disposed on an outer surface of the second substrate,
wherein the polarizer transmits the light which oscillates in the second direction, and absorbs light which oscillates in the first direction different from the second direction.

11. The liquid crystal of claim 10, wherein:
the first direction and the second direction are perpendicular to each other.

12. The liquid crystal display of claim 1, further comprising:
a second substrate facing the first substrate;
a polarizer disposed on an outer surface of the second substrate; and
a second optical conversion layer disposed on an inner surface of the second substrate opposing the outer surface,
wherein the second conversion layer reflects the light which oscillates in the first direction, and transmits the light which oscillates in the second direction.

13. The liquid crystal display of claim 12, wherein:
the first direction and the second direction are perpendicular to each other.

14. The liquid crystal display of claim 12, wherein:
the polarizer absorbs the light which oscillates in the first direction, and transmits the light which oscillates in the second direction.

15. The liquid crystal display of claim 1, further comprising:
an insulating layer disposed between the plurality of thin films and the first optical conversion layer.

16. The liquid crystal display of claim 1, further comprising:
an insulating layer disposed on the first optical conversion layer, wherein a thickness of the insulating layer overlapping the reflecting unit of the first optical conversion layer is larger than a thickness of the insulating layer overlapping the polarizing unit of the first optical conversion layer.

17. A method of forming a liquid crystal display, the method comprising:
providing an optical conversion layer and a plurality of thin films on an upper surface of a first display substrate of a first display panel, the optical conversion layer in a different layer than the plurality of thin films;
providing a polarizer on an upper surface of a second display substrate of a second display panel; and
disposing the first and second display panels facing each other, the optical conversion layer facing the second display panel,
wherein the optical conversion layer includes:
a reflecting unit reflecting incident light to the liquid crystal display; and
a polarizing unit in a same layer as the reflecting unit,
wherein the polarizing unit transmits light which oscillates in a first direction, among the incident light, and reflects light which oscillates in a second direction different from the first direction, among the incident light,
wherein the plurality of thin films include a signal line, a switching element connected to the signal line, and a pixel electrode connected to the switching element.

18. The method of claim 17, wherein the forming an optical conversion layer on an upper surface of a first display substrate comprises:
disposing a metal layer directly on the upper surface of the first display substrate;
patterning a portion of the disposed metal layer excluding an area of the reflecting unit to simultaneously form both the reflecting unit and the polarizing unit;
wherein
the polarizing unit includes a plurality of a metal pattern spaced apart from each other; and
the reflecting unit and the polarizing unit include a same material.

19. The liquid crystal display of claim 1, wherein the first optical conversion layer is between the plurality of thin films and the first substrate.

* * * * *